United States Patent
Porter et al.

(10) Patent No.: US 8,851,755 B2
(45) Date of Patent: Oct. 7, 2014

(54) SELF-ALIGNING TRACK ROLLER BEARING

(71) Applicant: Roller Bearing Company of America, Inc., Oxford, CT (US)

(72) Inventors: Matthew Porter, Irvine, CA (US); Robert A. James, Huntington Beach, CA (US); Michael S. Gostomski, Stamford, CT (US)

(73) Assignee: Roller Bearing Company of America, Inc., Oxford, CT (US)

( * ) Notice: Subject to any disclaimer, the term of this patent is extended or adjusted under 35 U.S.C. 154(b) by 0 days.

(21) Appl. No.: 14/084,999

(22) Filed: Nov. 20, 2013

(65) Prior Publication Data

US 2014/0140646 A1    May 22, 2014

Related U.S. Application Data

(60) Provisional application No. 61/728,423, filed on Nov. 20, 2012.

(51) Int. Cl.
*F16C 23/04* (2006.01)
*F16C 27/06* (2006.01)
*F16C 33/20* (2006.01)

(52) U.S. Cl.
CPC .............. *F16C 23/045* (2013.01); *F16C 27/063* (2013.01); *F16C 33/201* (2013.01)
USPC .......................................... 384/203

(58) Field of Classification Search
USPC ........................... 384/192, 202, 203, 205, 206
See application file for complete search history.

(56) References Cited

U.S. PATENT DOCUMENTS

| | | | | |
|---|---|---|---|---|
| 4,132,452 | A | * | 1/1979 | Riegler et al. .................. 384/202 |
| 5,110,221 | A | * | 5/1992 | Narkon et al. ................. 384/203 |
| 5,288,354 | A | | 2/1994 | Harris et al. |
| 5,439,203 | A | * | 8/1995 | Hadano ......................... 384/203 |
| 5,975,760 | A | * | 11/1999 | Germano ....................... 384/202 |
| 5,993,065 | A | * | 11/1999 | Ladzinski et al. ............ 384/206 |

* cited by examiner

*Primary Examiner* — Thomas R Hannon
(74) *Attorney, Agent, or Firm* — MKG, LLC

(57) ABSTRACT

A self-aligning track roller bearing includes an inner member having a central axis and a convex surface and an outer member has a concave surface and is angularly displaceable relative to the central axis. A lubricious liner is positioned between the convex surface and the concave surface. The lubricious liner creates a force resisting movement of the inner member relative to the outer member. The bearing includes a snubber engaging an axially facing surface of the outer member and another snubber engaging another axially facing surface of the outer member. Outer rings are coupled to opposing axially facing surfaces of the inner member to retain the snubbers in engagement therewith. One or more of the snubbers are elastically deformable in response to angular displacement of the outer member and have a resilience set to overcome the force and urge the outer member to be concentric with the central axis.

10 Claims, 5 Drawing Sheets

SELF-ALIGNING TRACK ROLLER BEARING

CROSS REFERENCE TO RELATED APPLICATION

This application claims the benefit of U.S. Provisional Patent Application No. 61/728,423, filed on Nov. 20, 2012, the contents of which are incorporated herein by reference in its entirety and the benefits of which are fully claimed herein.

FIELD OF THE INVENTION

The present invention relates to a track roller bearing. More specifically, the present invention relates to a self-aligning track roller bearing having first and second snubber rings mounted adjacent to a first and second axially facing surface, respectively, of an outer member of the bearing to facilitate self-alignment of the outer bearing member relative to the inner bearing member.

BACKGROUND OF THE INVENTION

The present invention relates to a track roller and more particularly, to a self-aligning track roller bearing for accommodation to variable track surfaces. A problem with known track roller bearings is that it can be difficult to facilitate realignment of a central axis of the inner member with a central axis of the outer member. It is known to provide stabilizing means at either end of a track roller bearing to facilitate realignment. A problem with known assemblies is that the stabilizing means can become misaligned themselves over time thereby decreasing their effectiveness and causing further misalignment. Another problem with known stabilizing means is that they tend to interfere with a portion of the bearing rotating relative to the stabilizing means further decreasing their effectiveness.

SUMMARY OF THE INVENTION

The present invention resides in one aspect in a self-aligning track roller bearing. The self-aligning track roller bearing includes an inner member having a central axis and a convex arcuate bearing surface. The self-aligning track roller bearing includes an outer member positioned around the inner member coaxially with the central axis. The outer member has a concave arcuate bearing surface that cooperates with the convex arcuate bearing surface such that the outer member is rotatably mounted about the central axis of the inner member and angularly displaceable relative to the central axis. A first lubricious liner is positioned between the convex arcuate bearing surface and the concave arcuate bearing surface. The first lubricious liner creates a friction force for resisting movement (e.g., angular or rotational movement) of the outer member relative to the inner member. A first snubber ring engages a first axially facing surface defined by the outer member. The first snubber ring is manufactured from a resilient material (e.g., an elastomeric material). A second snubber ring engages a second axially facing surface defined by the outer member. The second snubber ring is manufactured from the resilient material (e.g., an elastomeric material). A first outer ring is coupled to a third axially facing surface defined by the inner member. The first outer ring is configured to retain the first snubber ring in engagement with the first axially facing surface. A second outer ring is coupled to a fourth axially facing surface defined by the inner member. The second outer ring is configured to retain the second snubber ring in engagement with the second axially facing surface. The first snubber ring and/or the second snubber ring is/are elastically deformable in response to angular displacement of the outer member and have a resilience of a predetermined magnitude to overcome the first force and urge the outer member to be concentric with the central axis.

In one embodiment, the self-aligning track roller bearing includes a cylindrical shaft having an exterior surface and the inner member has an interior surface defining a bore extending therethrough. A portion of the shaft is positioned in the bore. The self-aligning track roller bearing also includes a second lubricious liner positioned between the exterior surface and the interior surface. The second lubricious liner defines a second force for rotation of the inner member about the shaft. The second force is less than the first force, such that the inner member rotates about the shaft while the outer member is stationary with respect to rotation about the inner member.

DESCRIPTION OF THE INVENTION

Figure 1:
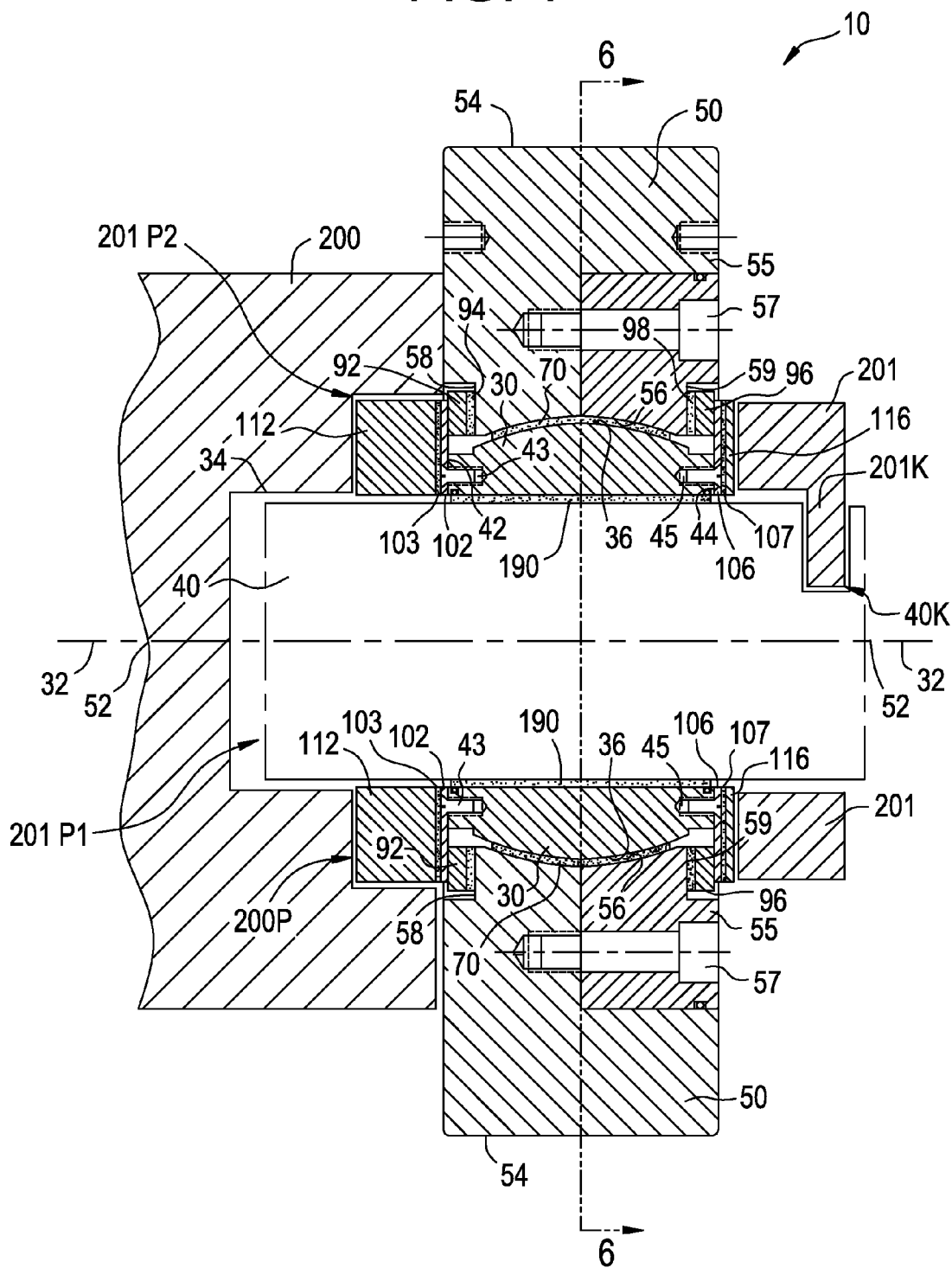
FIG. 1 is a cross-sectional view of a self-aligning track roller bearing in accordance with one embodiment of the present invention.
Figure 2:
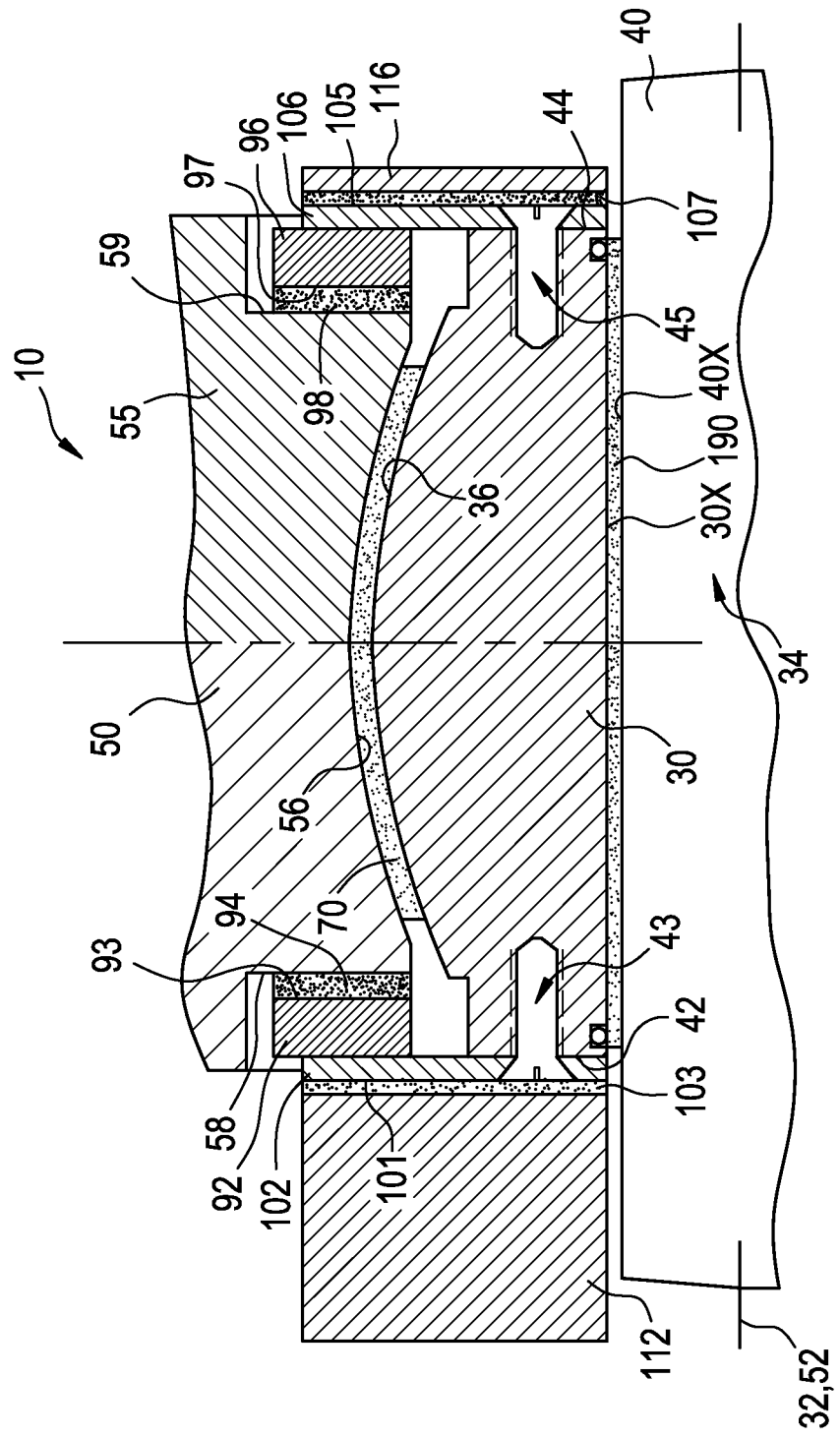
FIG. 2 is a cross-sectional view of a portion of the self-aligning track roller bearing shown in FIG. 1.
Figure 3:
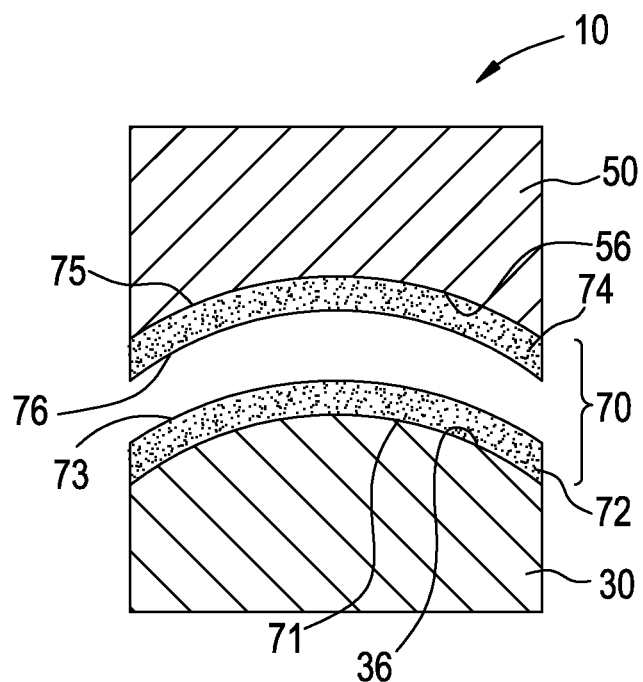
FIG. 3 is a cross-sectional view of a portion of the self-aligning track roller bearing shown in FIG. 1.

In reference to FIGS. 1-3, a self-aligning track roller bearing 10 in accordance with the present invention is shown. The self-aligning track roller bearing 10 includes an inner member 30 having a central axis 32. The inner member 30 includes a convex arcuate bearing surface 36. The inner member 30 has an interior surface 30X which defines a bore 34 extending therethrough. In some embodiments, the bore 34 may be coaxial with the central axis 32 of the inner member 30. In other embodiments, the bore 34 may be parallel to and radially displaced from the central axis 32 of the inner member 30, i.e. eccentric. The self-aligning track roller bearing 10 includes an outer member 50. The outer member 50 is annular about a central axis 52 of the outer member 50. The central axis 52 is coaxial with the central axis 32 of the inner member 30 when the roller track bearing 10 is aligned, as shown in FIGS. 1-3. The outer member 50 includes a concave arcuate bearing surface 56 that faces inwardly toward the central axis 52 of the outer member 50. A shaft 40 having an exterior surface 40X is received in the bore 34. The shaft 40 is concentric with the central axes 32 and 52.

The inner member 30 is disposed in an interior area defined by the outer member 50. The outer member 50, together with the inner member 30 are rotatable (as described herein with reference to FIG. 6) about the central axis 32 of the inner member 30 and the shaft 40. The outer member 50 is angularly displaceable (as described herein with reference to FIG. 5) relative to the central axis 32 of the inner member 30.

It should be understood that although the embodiment shown in FIGS. 1-3 shows the central axis 32 of the inner member 30 and the central axis 52 of the outer member 50 as being coaxial, the present invention is not limited in this regard. For example, in other embodiments, the central axis 52 of the outer member 50 can be parallel to and radially displaced from the central axis 30 of the inner member 30, as is the case in an eccentric bearing.

An outer surface 54 of the outer member 50 defines a rolling surface for contacting a track (not shown in the FIGS.) during use of the self-aligning track roller bearing 10. A portion 55 of the outer member 50 is removable to facilitate installation of the inner member 30. The removable portion 55 can be fixed in position using fasteners 57 (as shown in FIG. 1), or any other known technique. In the embodiment shown, the inner member 30 and the outer member 50 are manufactured from ASTM A564 Type 630 (17-4PH) Stainless Steel Condition H1025. It should be understood, however, that any suitable material may be employed.

A lubricious liner 70 (e.g., a low friction liner) is secured to one or more of the convex arcuate bearing surface 36 and the concave arcuate bearing surface 56. The lubricious liner 70 is manufactured with a self-lubricating material, which allows lubricious properties of the lubricious liner 70 to be maintained without addition of a lubricating agent such as oil or grease. In reference to FIG. 3, an embodiment for securing lubricious liner is shown. The lubricious liner 70 includes an inner liner 72 that is secured to the convex arcuate bearing surface 36 and an outer liner 74 that is secured to the concave arcuate bearing surface 56. The inner liner 72 defines a bonding surface 71 that is secured to the convex arcuate bearing surface 36 by bonding using temperature and pressure. One example of bonding is an adhesive bonding process. The inner liner 72 also defines a second surface 73, opposite the bonding surface 71, which slidingly engages the outer liner 74 that is secured to the concave arcuate bearing surface 56. The outer liner 74 defines a bonding surface 75 that is secured to the concave arcuate bearing surface 56 in a similar fashion. Likewise, the outer liner 74 defines a second surface 76, which slidingly engages the second surface 73 of the inner liner 72. Although FIG. 3 discloses a self-aligning track roller bearing 10 in which the lubricious liner 70 is secured to both the convex arcuate bearing surface 36 and the concave arcuate bearing surface 56, the present invention is not limited in this regard. Other embodiments of the present invention may include, for example, a track roller bearing without any lubricious liner disposed between the two bearing surfaces, or, for example, a track roller bearing in which the lubricious liner is secured to only one of the convex arcuate bearing surface 36 and the concave arcuate bearing surface 56.

Figure 4:
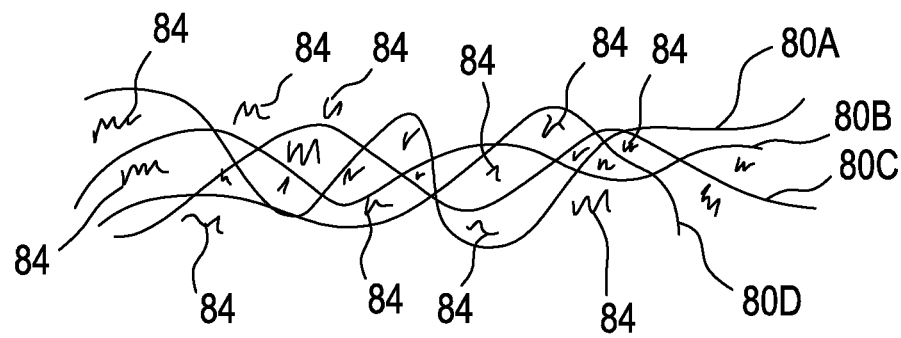
FIG. 4 is a cross-sectional view of a low friction liner in accordance with one embodiment of the present invention.

The lubricious liner 70 is manufactured from a material having low friction characteristics or qualities. In one embodiment, as shown for example in FIG. 4, the lubricious liner is a woven fabric 80. The woven fabric 80 includes a plurality of fibers 80A, 80B, 80C, and 80D interwoven with one another and polytetrafluoroethylene (PTFE) 84 interwoven therewith. The fibers 80A, 80B, 80C, and 80D include, for example, a polyester material, a stainless steel material and/or glass material. The fibers 80A, 80B, 80C, and 80D interwoven with the PTFE enhance bondability of liner 70 to the bearing surfaces 36, 56. In one example, the lubricious liner 70 is Lubron TF woven PTFE fabric liner which is commercially available from RBC Bearings, Oxford, Conn., United States. The lubricious liner 70 has properties and characteristics sufficient to withstand high loads with insignificant wear. It should understood that the specific examples provided above are for illustration purposes only and are not intended to limit the present invention to any specific brand or type of lubricious liner.

Referring to FIGS. 1 and 2, another lubricious liner 190 is positioned between the inner member 30 and the shaft 40, so that the lubricious liner 190 engages the interior surface 30X of the inner member 30 and the exterior surface 40X of the shaft 40. The lubricious liner 190 enables rotation of the inner member 30 about the shaft 40 as described further herein with reference to FIG. 6. The lubricious liner 190 is similar to the lubricious liner 70 described herein. In one embodiment, the lubricious liner 190 is secured to the exterior surface 40X and slidingly engages the interior surface 30X. In another embodiment the lubricious liner 190 is secured to the interior surface 30X and slidingly engages the exterior surface 40x.

While the inner member 30 is shown and described as being rotatable around the shaft, the present invention is not limited in this regard as the shaft 40 can be fixed about the central axis 32 relative to the inner member 30 by an interference fit between the shaft 40 and the bore 34, by welding, thermal installation, pinning, or by providing the bore 34 and the shaft 40 with similarly shaped angular cross-sections to inhibit rotation slippage. In yet other embodiments, the inner member 30 and the shaft 40 are the same component.

In reference to FIGS. 1-3, the self-aligning track roller bearing 10 includes a first snubber ring 92 mounted adjacent to a first axially outward facing surface 58 of the outer member 50. A second snubber ring 96 is mounted adjacent to a second outwardly facing surface 59 of the outer member 50. The snubber rings 92, 96 are generally annular and define a bore extending therethrough. At least a portion of the inner member 30 passes through the bore of each snubber ring 92, 96. Each snubber ring 92, 96 includes an axially inwardly facing surface 93, 97, respectively (labeled in FIG. 2). At least a portion of each axially inwardly facing surface 93, 97 is adjacent to the first axially outward facing surface 58 and the second outwardly facing surface 59 of the outer member 50, respectively. In the embodiment shown, each axially inwardly facing surface 93, 97 has acetal plastic layer 94, 98 bonded thereto (e.g., with an epoxy) to facilitate relative movement of the outer member 50 and the inner rings 92, 96 during use of the self-aligning track roller bearing 10.

It should be understood that although acetal plastic is disclosed above, the present invention is not limited in this regard and any known low friction or lubricious material may by employed. In some embodiments, it is not necessary to include a low friction or lubricious material. In the embodiment shown, the snubber rings 92, 96 comprise an elastomeric material. The elastomeric material can be, for example, an elastomer such as natural or synthetic rubber. In the embodiment shown, the inner rings 92, 96 are configured as snubber washers. While the inner rings 92, 96 are described as comprising an elastomer the present invention is not limited in this regard as the inner rings 92, 96 may comprise different materials including but not limited to one of the inner rings comprising an elastomer and the other inner ring comprising another material such as plastic (e.g., one or more biasing members such as springs) or metal (e.g., one or more metal biasing members such as springs).

The self-aligning track roller bearing 10 includes a first outer ring 102 and a second outer ring 106. The outer rings 102, 106 are generally annular and define a bore extending therethrough. In the embodiment shown, the first and second outer rings 102, 106 comprise stainless steel washers. It should be understood, however, that the present invention is not limited in this regard any suitable material may be employed. The first outer ring 102 is coupled to a first axially outward facing surface 42 of the inner member 30 by a fastener 43. The second outer ring 106 is coupled to a second outwardly facing surface 44 of the inner member 30 by a fastener 45. It should be understood that although two fasteners 43 coupling the first outer ring 102 to the inner member 30 are illustrated in the cross-sectional view shown in FIG. 1, additional fasteners may be used along the circumference of the first outer ring 102, and, likewise, additional fasteners may be used along the circumference of the second outer ring 106.

An axially outwardly facing surface 101 of the first outer ring 102 is adjacent to a first spacer 112. Similarly, and axially outwardly facing surface 105 of the second outer ring 106 is adjacent to a second spacer 116. The axially outwardly facing surfaces 101, 105 have a lubricious liner 103, 107 secured thereto, respectively, to facilitate relative movement of the first outer ring 102 relative to the first spacer 112, and to facilitate relative movement of the second outer ring 106 relative to the second spacer 116. In the embodiment shown in FIG. 3, the lubricious liner 103, 107 is Lubron TF woven PTFE fabric liner, and are similar to the lubricious liner 70 described herein. It should be understood that although the embodiment shown in FIGS. 1 and 2, show the first outer ring 102 and the second outer ring 106 as having a lubricious liner 103, 107 secured to the axially outwardly facing surfaces 101, 105, respectively, the present invention is not limited in this regard. For example, the outer rings 102, 106 may not include the lubricious liner, or the outer rings 102, 106 may include lubricious liners on both axially inwardly and outward facing surfaces. In one embodiment, the first spacer 112 and the second spacer 116 are manufactured from a steel alloy and have polished surfaces.

At least a portion of the first outer ring 102 is adjacent to at least a portion of the first snubber ring 92. The first outer ring 102 is configured to retain the first snubber ring 92 adjacent to the first outwardly facing surface 58 of the outer member 50. At least a portion of the second outer ring 106 is adjacent to at least a portion of the second snubber ring 96. The second outer ring 106 is configured to retain the second snubber ring 96 adjacent to the second outwardly facing surface 59 of the outer member 50. During use of the self-aligning track roller bearing 10, the snubber rings 92, 96 and the outer rings 102, 106 facilitate realignment (i.e., self-alignment) of the central axis 52 of the outer member 50 with the central axis 32 of the inner member 30 when the members 30, 50 are rotated angularly relative to each other, and the snubber rings 92 and 96 and the outer rings 102 and 106 facilitate realignment of the self-aligning track roller bearing, as described further herein.

Referring back to FIG. 1, the self-aligning track roller bearing 10 is disposed between a first housing 200 and a second housing member 201. The first housing 200 defines a pocket 200P1 which extends radially outward into a second pocket 200P2. The first pocket 200P1 is configured to receive an end portion of the shaft 40 therein. The second pocket 200P2 is configured to receive the first spacer 112 therein. The first spacer 112 is friction fit into the pocket and is configured to be stationary relative to the housing 200.

Still referring to FIG. 1, the second housing member 201 is disposed around an opposing end of the shaft 40 and is keyed thereto by a key 201K fit into a keyway 40K of the shaft 40 to axially retain the self-aligning track roller bearing 10 between the first housing 200 and the second housing member 201.

Figure 5:
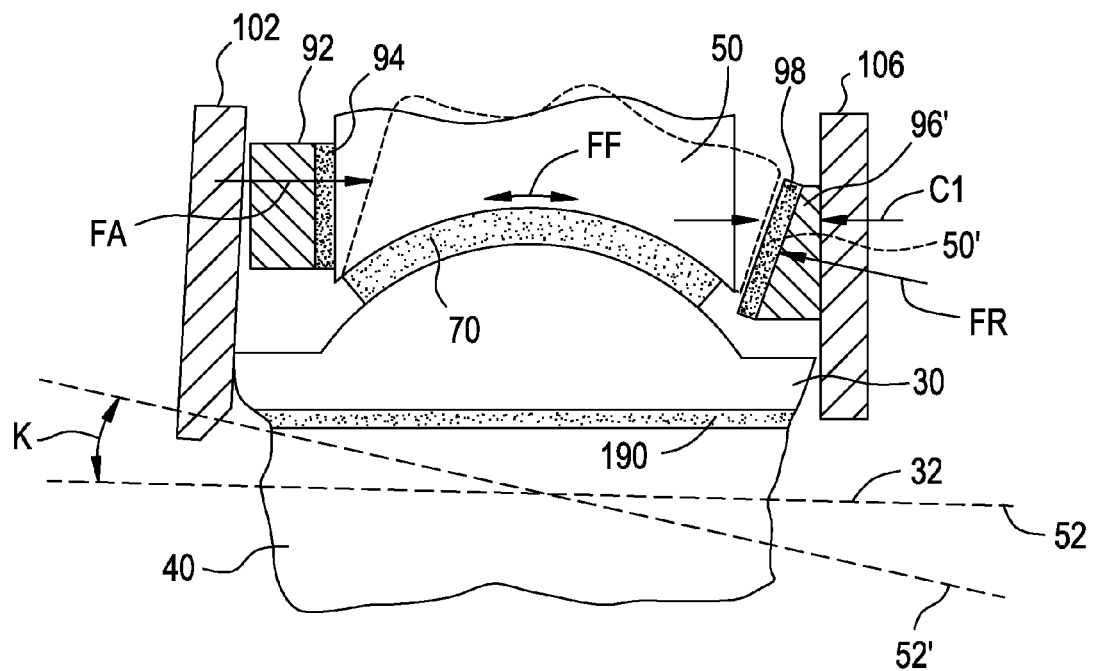
FIG. 5 is a schematic cross-sectional view of a portion of the self-aligning track roller bearing of FIG. 1 showing angular displacement of the outer member relative to the inner member.

During operation of the self-aligning track roller bearing 10, the outer member 50 is angularly displaceable relative to the central axes 52 and 32, as shown in FIG. 5. In a self-aligned state (as shown by the solid lines in FIG. 5) the axes 52 and 32 are coaxial and the outer member 50 and the inner member 30 are concentric about the axes 52 and 32. The lubricious liner 70 creates a friction force FF for resisting movement of the outer member 50 relative to the inner member 30. Application of an applied force FA to the outer ring 50 causes the outer ring to angularly displace as shown by the dashed lines outlining the displaced outer ring 50' and the angularly displaced axis 52'. In one embodiment, the displaced axis 52' is displaceable and self-alignable over an angle K having a magnitude of between about 0.5 degrees and 1.0 degree. In one embodiment, the displaced axis 52' is displaceable and self-alignable over an angle K having a magnitude of between about 1.0 degree and 2.0 degrees. In one embodiment, the displaced axis 52' is displaceable and self-alignable over an angle K having a magnitude of between about 1.0 degree and 5.0 degrees. In one embodiment, the displaced axis 52' is displaceable and self-alignable over an angle K having a magnitude of between about 1.0 degree and 10.0 degrees. In one embodiment, the displaced axis 52' is displaceable and self-alignable over an angle K having a magnitude of between about 1.0 degree and 20.0 degrees. In one embodiment, the displaced axis 52' is displaceable and self-alignable over an angle K having a magnitude of up to about 30 degrees.

As the outer member 50' is displaced, the second snubber ring 96 elastically deforms (e.g., becomes elastically compressed as indicated by the arrows C1) to become an elastically compressed second snubber ring 96'. The elastically compressed second snubber ring 96' applies a reaction force FR on the outer member 50 to resist the angular displacement of the outer member 50'. When the applied force FA is greater than the sum of the friction force FF and the reaction force FR, the outer ring 50 will become angularly displaced, as shown by the dashed lines connoting the displaced outer ring 50'. When the sum of the applied force FA and the friction force FF are reduced below the reaction force FR, the elastically compressed second snubber ring 96' has an elasticity and/or resiliency of a predetermined value that is adequate to expand and return (i.e., self-align) the outer member 50 to the self-aligned state wherein the axes 52 and 32 are coaxial and the outer member 50 and the inner member 30 are concentric about the axes 52 and 32.

Figure 6:
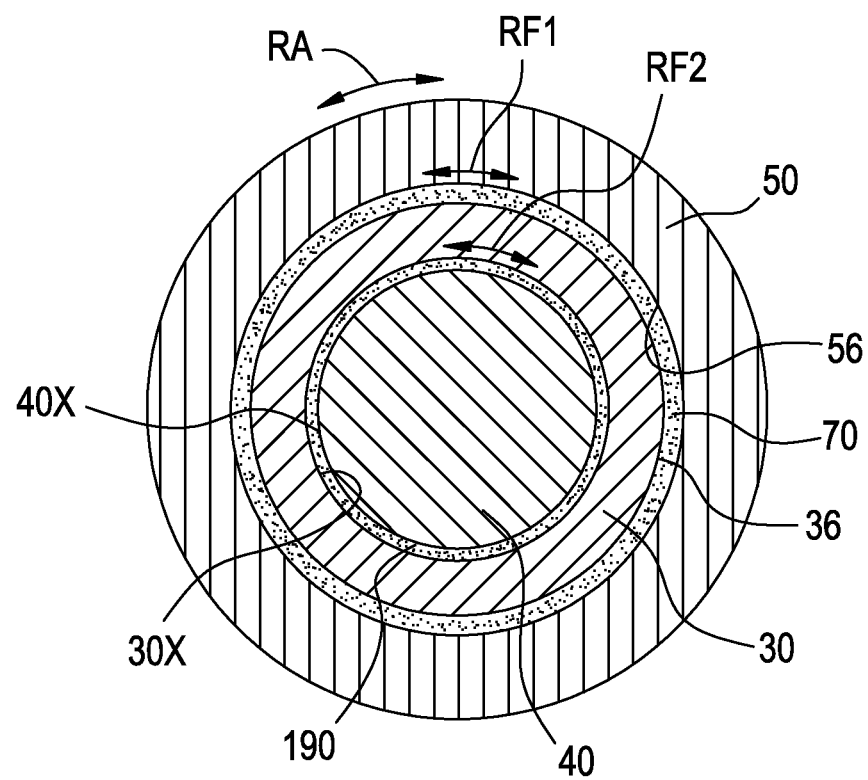
FIG. 6 is a schematic side cross sectional view of a portion of the self-aligning track roller bearing of FIG. 1, taken across line 6-6 of FIG. 1 and showing rotational displacement of the outer member and inner member relative to the shaft.

Referring to FIG. 6, when a rotational force RA is applied to the outer member 50 a frictional force RF1 is created at an interface between the lubricious liner 70 and the interior surface 56 of the outer member (or the exterior surface 36 of the inner member 30). The frictional force RF1 resists rotation of the outer member 50 relative to the inner member 30. In addition, the frictional force RF1 is transmitted through the inner member 30 and results in a frictional reaction force RF2 between the lubricious liner 190 and the interior surface 30X of the inner member 30 (or the exterior surface 40X) of the shaft 40. The frictional reaction force RF2 is less than the frictional force RF1, such that when the rotational force RA is applied to the outer member 50, the inner member 30 rotates about the shaft 40 while the outer member 50 is stationary with respect to rotation about the inner member 30. In the event that the lubricious liner 190 degrades and the frictional reaction force RF2 increases above the frictional force RF1, then when the rotational force RA is applied to the outer member 50, the outer member 50 will rotate about the inner member 30 and the inner member will remain stationary relative to the shaft 40.

Although the present invention has been disclosed and described with reference to certain embodiments thereof, it should be noted that other variations and modifications may be made, and it is intended that the following claims cover the variations and modifications within the true scope of the invention.

What is claimed is:

1. A self-aligning track roller bearing comprising:
    an inner member having a central axis and a convex arcuate bearing surface,
    an outer member positioned around the inner member coaxially with the central axis, the outer member having a concave arcuate bearing surface that cooperates with the convex arcuate bearing surface such that the outer member is rotatably mounted about the central axis of the inner member and angularly displaceable relative to the central axis;
    a first lubricious liner positioned between the convex arcuate bearing surface and the concave arcuate bearing surface, the first lubricious liner defining a first friction force for resisting movement of the outer member relative to the inner member;
    a first snubber ring engaging a first axially facing surface defined by the outer member, the first snubber ring being manufactured from a resilient material;
    a second snubber ring engaging a second axially facing surface defined by the outer member, the second snubber ring being manufactured from the resilient material;
    a first outer ring coupled to a third axially facing surface defined by the inner member, the first outer ring configured to retain the first snubber ring in engagement with the first axially facing surface;
    a second outer ring coupled to a fourth axially facing surface defined by the inner member, and the second outer ring configured to retain the second snubber ring in engagement with the second axially facing surface; and
    at least one of the first snubber ring and the second snubber ring are elastically deformable in response to angular displacement of the inner member and have a resilience of a predetermined magnitude to overcome the first force and urge the inner member to be concentric with the central axis.

2. The self-aligning track roller bearing of claim 1, further comprising:
    a cylindrical shaft having an exterior surface;
    the inner member having an interior surface defining a bore extending therethrough;
    a portion of the shaft being positioned in the bore; and
    a second lubricious liner positioned between the exterior surface and the interior surface, the second lubricious liner defining a second force for rotation of the inner member about the shaft, the second force being less than the first force, such that the inner member rotates about the shaft while the outer member is stationary with respect to rotation about the inner member.

3. The self-aligning track roller bearing of claim 2, wherein the second lubricious liner is woven PTFE fabric liner.

4. The self-aligning track roller bearing of claim 1, wherein the first lubricious liner is woven PTFE fabric liner.

5. The self-aligning track roller bearing of claim 1, wherein at least one of the first snubber ring and the second snubber ring comprise an elastomer.

6. The self-aligning track roller bearing of claim 5, wherein the elastomer comprises rubber.

7. The self-aligning track roller bearing of claim 1, wherein an axially inwardly facing surface of each of the first snubber ring and the second snubber ring comprises acetal plastic epoxy bonded thereto to facilitate movement of the outer member relative to the first snubber ring and the second snubber ring.

8. The self-aligning track roller bearing of claim 1, wherein a third lubricious liner is secured to an axially outwardly facing surface at least one of the first outer ring and the second outer ring.

9. The self-aligning track roller bearing of claim 8, wherein the third lubricious liner comprises a woven PTFE fabric liner.

10. The self-aligning tracker roller bearing of claim 1, wherein the first outer ring is coupled to a first axial end of the inner member with at least one first fastener, and wherein the second outer ring is coupled to a second axial end of the inner member with a second fastener.

* * * * *